Aug. 18, 1959 L. A. WHETTER 2,900,506

PHASE DETECTOR

Original Filed Jan. 20, 1954

INVENTOR
LLOYD A. WHETTER
BY
Thomas M. Ferrill, Jr.
ATTORNEY

United States Patent Office 2,900,506
Patented Aug. 18, 1959

2,900,506

PHASE DETECTOR

Lloyd A. Whetter, Hicksville, N.Y., assignor to Sperry Rand Corporation, a corporation of Delaware Continuation of abandoned application Serial No. 405,112, January 20, 1954. This application May 13, 1955, Serial No. 508,035

8 Claims. (Cl. 250—31)

This invention relates to a demodulator, and more particularly, is concerned with a phase detector circuit for producing a D.-C. output which changes in polarity with reversal in phase of an alternating current input signal. This is a continuation of application Serial No. 405,112, filed January 20, 1954, and abandoned May 26, 1955.

It is the general object of this invention to provide an improved phase detector circuit which is characterized by simplicity, efficiency, low power consumption, and linearity of response.

Another object of this invention is to provide a phase detector circuit which provides substantial gain between the input and output signals.

These and other objects of the invention which will become apparent as the description proceeds are achieved by the provision of a circuit comprising first and second similar transistors each having base, emitter, and collector electrodes. An input transformer having a center-tapped secondary winding couples an A.-C. input signal to the base electrodes of the transistors. The emitter electrodes of the first and second transistors are connected to the center tap of the secondary winding. The D.-C. output signal is derived across a pair of load resistors connected in series between the collector electrodes of the transistors, and an alternating reference voltage source is coupled in series with a diode rectifier between the center tap of the secondary winding of the input transformer and the series connection point of the output load resistors. Capacitor means may be connected across the pair of resistors for smoothing the direct current output signal developed across the resistors.

For a better understanding of the invention, reference should be had to the accompanying drawing, wherein.

Figure 1:
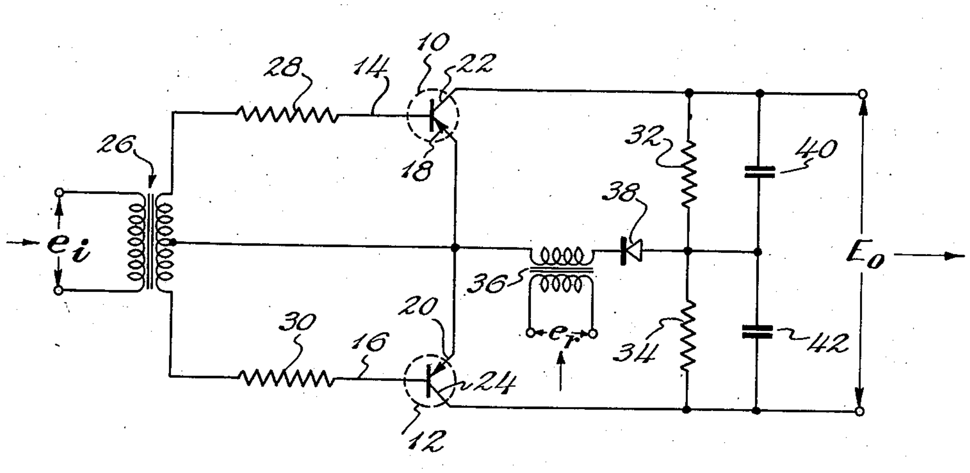
Fig. 1 is a schematic diagram of a preferred embodiment of the invention.

Referring to Fig. 1, the numerals 10 and 12 indicate generally first and second transistors which are preferably of the p-n-p junction transistor type. However, point contact transistors may be used, as well as n-p-n type junction transistors, although the latter type requires some modification in the circuit as will hereinafter be pointed out. Transistors 10 and 12 include respectively base electrodes 14 and 16, emitter electrodes 18 and 20, and collector electrodes 22 and 24.

An input signal $e_i$, which is an alternating voltage of varying amplitude and phase, is coupled by means of an input transformer 26 to the base electrodes 14 and 16 of the respective transistors 10 and 12. Current limiting resistors 28 and 30 connect opposite ends of the secondary winding of the input transformer 26 respectively to the base electrodes 14 and 16. The emitter electrodes 18 and 20 of the respective transistors 10 and 12 are connected to the center tap of the secondary winding of the input transformer 26 to complete the emitter circuit of the phase detector.

The output circuit comprises a pair of resistors 32 and 34 connected in series between the collector electrodes 22 and 24 of the respective transistors 10 and 12. The reference voltage $e_r$ is coupled by means of a transformer 36 between the center tap of the secondary winding of the transformer 26 and the series connection point between the resistors 32 and 34, a diode rectifier 38 being connected in series with the secondary of the transformer 36 to limit reverse current flow through the transistors 10 and 12 in a manner and for reasons which will become apparent. To limit the ripple in the D.-C. output signal $E_o$, filtering condensers 40 and 42 are connected across the resistors 32 and 34 respectively.

Operation of the circuit, as above described, may be best understood by considering the action of the transistors 10 and 12. The junction transistor may be considered as a current amplifying device. When the proper bias is provided between the emitter and the base with the proper supply voltage between the collector and the base, current flows in the emitter and collector circuits. However, the current in the collector circuit is a function of the current in the emitter circuit and is substantially independent of the external load impedance in the collector circuit. Thus if the output signal is derived across a relatively high impedance in the collector circuit and the input signal is applied across the relatively low impedance in the emitter circuit, amplification between the input and output signals may be realized.

In the p-n-p type junction transistor, the potential on the collector electrode must be negative with respect to the base, and the emitter electrode must be positive with respect to the base to establish current flow in the collector circuit with control of the collector current by the emitter. If the emitter electrode is made negaive with respect to the base, current flow in the collector circuit is cut off. It should be noted further that when the collector becomes positive with respect to the base, the p-n-p transistor becomes a low impedance device, that is, it acts as a diode conducting in the forward direction.

In the circuit described, when the reference voltage $e_r$ passes through the half cycle in which the potential on the collectors of the transistors 10 and 12 would be made positive with respect to the bases, under which condition the transistors would present a relatively low impedance, current flow is prevented by the diode 38. When the reference voltage $e_r$ is on the opposite half wave in which the collectors are rendered negative with respect to the bases, the diode 38 providing a substantially conductive path therefor, only the transistor in which the emitter is rendered positive with respect to the base by virtue of the input signal $e_i$ is conductive. Hence it will be seen that on alternate half cycles of the reference voltage $e_r$, current flows in either the load resistor 32 or the load resistor 34 depending on the instantaneous polarity of the input voltage $e_i$, so that the polarity of the output voltage $E_0$ depends on the phase relationship between the input voltage $e_i$ and the reference voltage $e_r$. The capacitors 40 and 42 provide filtering for the A.-C. component of the pulsating half-wave rectified D.-C. current in the load resistors 32 and 34.

Since the amount of current flowing in the collector circuit of the conductive transistor is a function of the current in the emitter circuit, it will be seen that the voltages developed across the load resistor will be a function of the input voltage $e_i$. This relationship is shown in graphical form in Fig. 2 in which the D.-C. output signal $E_0$ is plotted as a function of the rms voltage of the input signal $e_i$. It will be noted in Fig. 2 that the slope of the curve is considerably greater than unity, so that a substantial gain is realized between the input and output signals. For example, with a one volt change in amplitude of the input voltage, the output voltage may change more than five volts.

Figure 2:
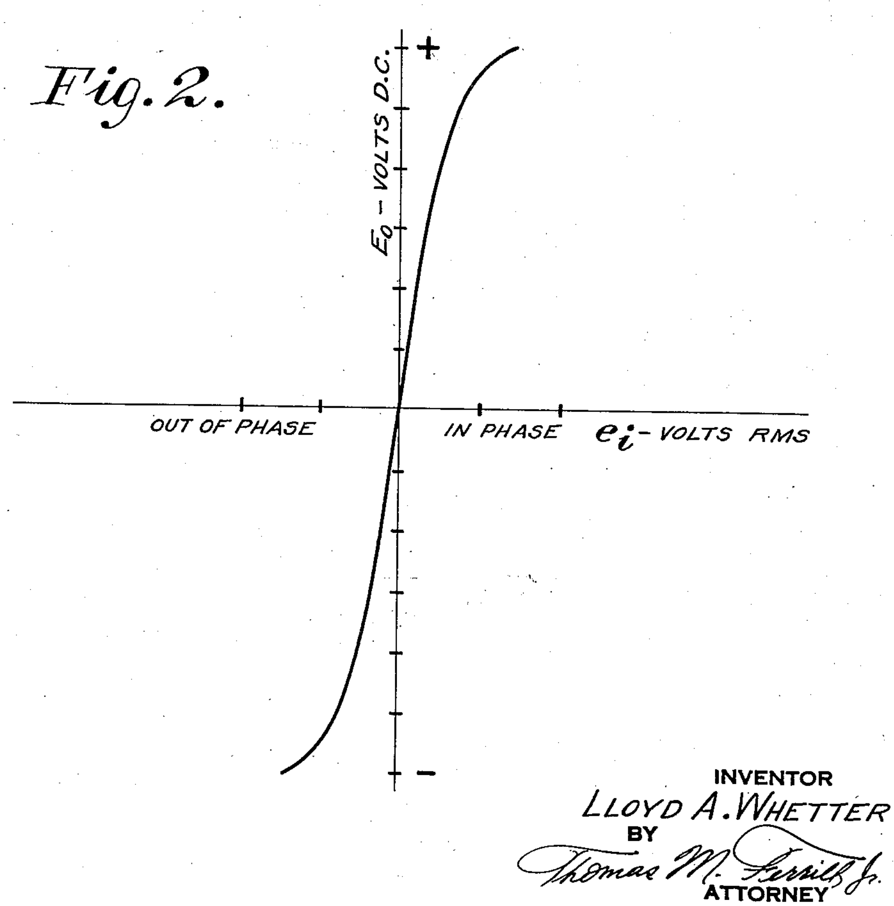
Fig. 2 is a graphical plot of the change in D.-C. output voltage with change in the A.-C. input signal.

The symmetry of the curve on either side of the ordinate axis in Fig. 2 depends on how carefully the transistors 10 and 12 are matched in their characteristics.

From the above description it will be recognized that the various objects of the invention have been achieved by the phase detector circuit as above described. One of the features of the detector is that the input circuit may be of low impedance which makes it particularly suitable in servo systems or the like where the signal source may be of low impedance, such as a tachometer, a synchro or the like. Not only is phase detection accomplished but substantial signal gain is realized at the same time. The substantially linear relationship between the change in input voltage and the change of output voltage makes the circuit useful as a demodulator.

It should be noted that the circuit described may be adapted to use n-p-n type junction transistors merely by reversing the polarity of the rectifier 38.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A phase detector comprising first and second transistors each having base, emitter and collector electrodes, an input transformer having a center-tapped secondary winding, the emitter electrodes of the first and second transistors being connected to the center tap of said secondary winding, a first resistor connecting the base electrode of the first transistor to one end of said secondary winding, a second resistor connecting the base electrode of the second transistor to the other end of said secondary winding, a pair of resistors connected in series between the collector electrodes of the transistors, means for coupling an alternating reference voltage of the same frequency as the input signal applied to said input transformer between the center tap of said secondary winding and the series connection point of said pair of resistors, a diode connected in series with said means, and capacitor means connected across said pair of resistors for smoothing the direct current output signal developed across said pair of resistors.

2. A phase detector comprising first and second transistors each having base, emitter and collector electrodes, an input transformer having a center-tapped secondary winding, the emitter electrodes of the first and second transistors being connected to the center tap of said secondary winding, means connecting the base electrode of the first transistor to one end of said secondary winding, means connecting the base electrode of the second transistor to the other end of said secondary winding, a pair of resistors connected in series between the collector electrodes of the transistors, means for coupling an alternating reference voltage of the same frequency as the input signal applied to said input transformer between the center tap of said secondary winding and the series connection point of said pair of resistors, a diode connected in series with said means, and capacitor means connected across said pair of resistors for smoothing the direct current output signal developed across said pair of resistors.

3. A phase detector comprising first and second transistors each having base, emitter and collector electrodes, an input transformer having a center-tapped secondary winding, the emitter electrodes of the first and second transistors being connected to the center tap of said secondary winding, means connecting the base electrode of the first transistor to one end of said secondary winding, means connecting the base electrode of the second transistor to the other end of said secondary winding, a pair of resistors connected in series between the collector electrodes of the transistors, means for coupling an alternating reference voltage source of the same frequency as the input signal applied to said input transformer between the center tap of said secondary winding and the series connection point of said pair of resistors, and means for preventing current flow from said reference voltage source in the reverse direction through said transistors.

4. A phase detector comprising first and second transistors each having base, emitter and collector electrodes, an input transformer having a center-tapped secondary winding, the emitter electrodes of the first and second transistors being connected to the center tap of said secondary winding, means connecting the base electrode of the first transistor to one end of said secondary winding, means connecting the base electrode of the second transistor to the other end of said secondary winding, a pair of resistors connected in series between the collector electrodes of the transistors, and means including a unidirectional impedance means for coupling a reference voltage source between the center tap of said secondary winding and the series connection point of said pair of resistors.

5. A demodulator circuit comprising first and second transistors, each including base, emitter, and collector electrodes, input impedance means coupled between the respective base electrodes, output impedance means coupled between the respective collector electrodes, and means including an alternating voltage source connected in series with a diode rectifier for applying a half-wave rectified alternating voltage between the emitter electrodes and the collector electrodes of said first and second transistors, the emitter electrodes being directly connected to each other and connected to the respective base electrodes through portions of said input impedance means.

6. A demodulator circuit comprising first and second transistors, each including base, emitter, and collector electrodes, output impedance means coupled between the respective collector electrodes, means including an alternating voltage source connected in series with a diode rectifier between said emitter electrodes and a mid-point on said output impedance means for applying an unfiltered half-wave rectified alternating voltage between the emitter electrodes and said mid-point, and input impedance means having separate portions thereof connected between the base and emitter electrodes of said first and second transistors respectively.

7. In combination, a pair of three terminal semi-conductor elements, an input transformer connected between first terminals of said elements, resistive means connected between second terminals of said elements, the third terminals being directly connected to each other and to the center point of said input transformer, and means for applying an unfiltered unidirectional pulsating voltage between the third terminals and the electrical mid-point of said resistive means.

8. A demodulator circuit comprising at least one semi-conductor element having base, emitter and collector electrodes, said semi-conductor element having the characteristic of conducting collector current in one direction to an extent that depends on the amount of emitter current flowing, and conducting collector current in the reverse direction to an extent that is substantially independent of the amount of emitter current flowing, a source of alternating input signals connected between said base and emitter electrodes, output impedance means coupled between said emitter and collector electrodes and means including an alternating reference voltage source and a diode for applying an unfiltered unidirectional pulsating reference voltage between said emitter and collector electrodes and in series with said output impedance means said diode being so poled as to impede the flow of said reverse direction collector current.

References Cited in the file of this patent

UNITED STATES PATENTS

| | | |
|---|---|---|
| 2,422,083 | Crosby | June 10, 1947 |
| 2,486,776 | Barney | Nov. 1, 1949 |
| 2,540,813 | Dome | Feb. 6, 1951 |
| 2,579,286 | Adamson | Dec. 18, 1951 |
| 2,698,392 | Herman | Dec. 28, 1954 |
| 2,698,416 | Sherr | Dec. 28, 1954 |